May 1, 1956   A. G. HORVATH ET AL   2,744,202
MOTOR
Filed Sept. 26, 1951

Inventors
ANTHONY G. HORVATH
WILLIAM H. KUNER
ROBERT L. WOLFE

Tom Walker
Attorney

United States Patent Office 2,744,202
Patented May 1, 1956

2,744,202
MOTOR

Anthony G. Horvath and William H. Kuner, Dayton, and Robert L. Wolfe, Springfield, Ohio, assignors to The Master Electric Company, Dayton, Ohio, a corporation of Ohio Application September 26, 1951, Serial No. 248,396

11 Claims. (Cl. 310—71)

This invention relates to electric motors and more particularly to a housing construction therefor particularly adaptable for sanitary motors.

In the so-called sanitary motors, used in dairies and in connection with food handling and processing equipment, it is endeavored to present a motor which is easy to clean externally, which offers minimum exposure of the essential elements of the motor to the corrosive action of strong cleansers and which offers little opportunity for the collection of dirt and vermin in, on and under the motor housing. The instant invention proposes a generally new housing for sanitary motors achieving the foregoing objectives to a greater degree than heretofore known.

The object of the invention is to improve the construction as well as the means and mode of assembly and the exterior appearance of electric motor housings, whereby they will be more efficient and satisfactory in use, uniform in appearance, having a minimum number of parts and be unlikely to get out of repair.

A further and more specific object of the invention is to achieve the objectives noted through modification of the actual motor housing and not merely by superimposing a protective covering about the motor.

A further object of the invention is to provide a splash proof housing construction which can be washed along with the equipment of which it is a part.

Still another object of the invention is to promote easy cleaning and maintenance, as well as to improve the appearance of the motor, by locating such functional elements as the condulet box and tie bolts internally of the motor housing, leaving the outer surface of the housing substantially free of irregularities, pockets and crevices.

A further object of the invention is to provide a motor housing embodying the advantageous structural features, the inherent meritorious characteristics herein set forth or their equivalents.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

In the accompanying drawing, wherein is shown the preferred, but obviously not necessarily the only form of embodiment of the invention, Fig. 1 is a perspective view of a motor in accordance with the illustrative embodiment of the invention, the closure plate being removed;

Like parts are indicated by similar characters of reference throughout the several views.

Figure 1:
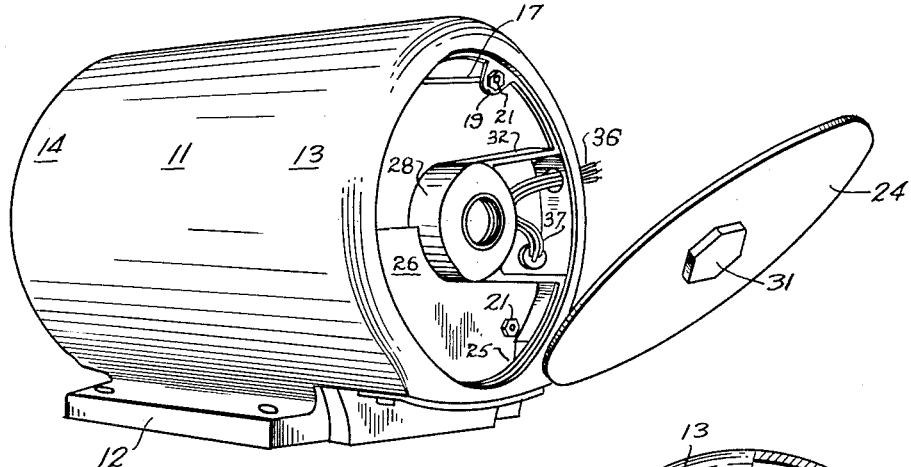
Figure 2:
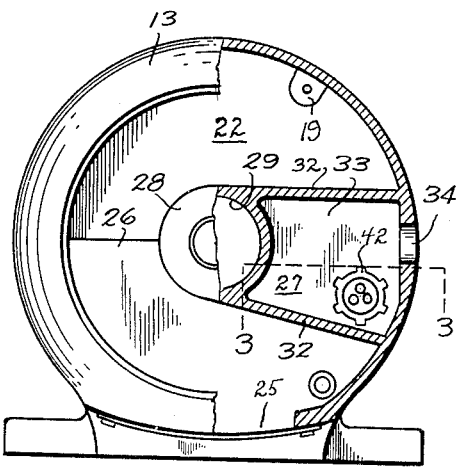
Fig. 2 is an end view of the motor with the closure plate removed.
Figure 3:
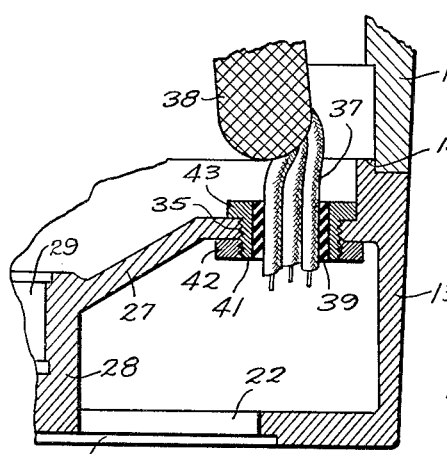
Fig. 3 is a fragmentary view in longitudinal section, taken substantially along the line 3—3 of Fig. 2.

Referring to the drawings, an electric motor, or more specifically, the housing for such motor, comprises in accordance with the illustrative embodiment of the invention a cast metal field ring 11. Formed integrally with the field ring 11 is a base 12, the bottom of which is flat so that it may rest in flush engagement with whatever support may be provided for the motor.

Figure 4:
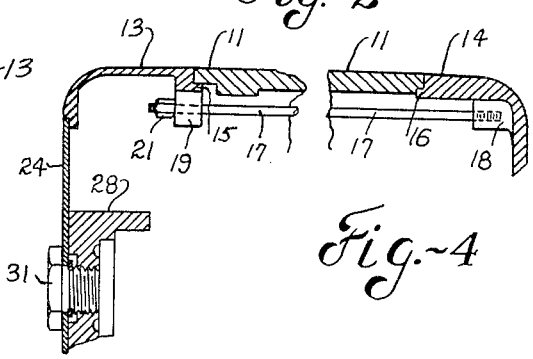
Fig. 4 is a fragmentary view in longitudinal section, showing the mounting of the tie bolts in the opposed end bells.

The opposite ends of the field ring are open, and have in abutting relation therewith respective end bells 13 and 14 (see Fig. 4). The end bells 13 and 14 have respective flanges 15 and 16 received within the ring 11. At their interengaging ends the field ring 11 and bells 13 and 14 have substantially the same external diameter. The outer surface of the assembly comprising the field ring and end bells accordingly is regular and substantially uninterrupted. The butt joints between the field ring and end bells are ground, after assembly, and the outer surface of the assembly finished as by painting. As a result, and as indicated in Fig. 1, the finished product presents substantially no visible division line between the field ring and the end bells.

The housing assembly is retained in a unitary relation by tie bolts 17 which extend in parallel spaced relation to the field ring 11, interiorly thereof. At their one end the bolts 17 are threaded so that they may be screwed into complementary threaded sockets in internal ears 18 on the end bell 14. At their opposite ends, the bolts 17 pass through openings in internal ears 19 on the end bell 13 and are threaded so that nuts 21 may be tightened thereon. In the front of the end bell 13 is a relatively large opening 22 through which access may be had to the bolts 17 for installation and for removal.

The opening 22 presents a recessed seat 23 for a cover plate 24 which accordingly lies flush with the front surface of end bell 13, when in place.

Considering the end bell 13, in the bottom thereof adjacent the front end is a screened radial opening 25 constituting an inlet for air to cool the motor. The air reaches the motor by flowing around a baffle 26 which is integral with the end bell 13 and projects radially inward substantially half way across the width of the bell. As shown, the baffle 26 serves as a support for one or more of the tie bolts 17. In the event, however, that the motor housing is constructed for other than splashproof service, the end bell 13 may be formed without the opening 25 and without the baffle 26 and additional ears 19 will be provided for support of all the tie bolts. In the event the motor housing is to be of the totally enclosed type the screened opening 25 is eliminated.

Also extending radially inward from the side wall of the end bell 13 is a rib formation 27 which terminates in an axial boss 28. A through opening 29 in the boss 28 is constructed and arranged to receive a bearing (not shown) for the inner end of the motor shaft.

To this point the internal construction of the end bell 14 is generally similar, there being provided a central bearing boss for the projecting or outer end of the motor shaft, together with the necessary ribs for supporting the bearing boss.

Returning to end bell 13, the wall of opening 29 is screw threaded to receive the externally threaded shank of tubular bolt 31 carried by the closure plate 24. The head of the bolt 31 is accessible from outside the closure plate so that it may be tightened or loosened to fasten the closure plate in place or to allow its removal.

The rib formation 27 has forwardly projecting walls 32 defining a condulet chamber or box 33. Chamber 33 faces the opening 22 and the walls 32 extend to a lateral plane substantially at the inner edge of opening 22. Thus when the cover or closure plate 24 is in place the condulet box 33 is substantially completely enclosed. A condulet opening 34 in the side wall of end bell 13 communicates box 33 with the exterior of the housing. An opening 35 in the condulet box 33 communicates the box with the interior of the field ring 11. As will be understood, and referring to Fig. 1, the opening 34 admits electrical conductors 36 to the condulet box 33 from a source of electrical current. The opening 35 admits motor leads 37 which at their inner ends are connected to the motor windings 38. The motor leads 37 are a permanent part of the motor and are connected to or disconnected from the conductors 36 in the condulet box 33 as may be necessary in the installation, removal and servicing of the motor. By removing the closure plate 24 the box 33 is exposed and accessible so that the wiring connections and disconnections can readily be made.

The motor leads 37 are sealed in the opening 35. They are contained in a sealing member 39 pressed or poured into place in a bushing 41 installed in the opening 35. The bushing 41 is clamped in place upon the rib formation 27 through a lock nut 42 which has a screw threaded mounting upon one end of the bushing so that it may be turned down to a seat upon rib 27, the other end of the bushing having an integral head 43 engageable with the opposite side of rib 27.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described our invention, we claim:

1. A housing for an electric motor, including a field ring, end bells abutting the opposite ends of said ring, boss formations on the inner surfaces of said end bells defining internal tie bolt supports enclosed by said end bells, and tie bolts extending between corresponding supports on said end bells and connecting the assembly comprising said field ring and end bells into a unitary structure, one of said end bells having an opening for common access to said tie bolts.

2. A housing for an electric motor, including a field ring, end bells abutting the opposite ends of said ring and substantially equal thereto in diameter, the assembly comprising said ring and said end bells presenting on its exterior a surface free of interruption by devices uniting the elements of said assembly, and tie bolts interconnecting said end bells internally thereof, said tie bolts extending in spaced parallel relation to said field ring interiorly thereof.

3. A housing for an electric motor according to claim 2, characterized in that one of said end bells is formed with a relatively large axial opening for access to said tie bolts, said opening being normally closed by a removable closure plate.

4. A housing for an electric motor, including a field ring, end bells closing the opposite ends of said field ring, at least one of said end bells being formed with a radial inwardly extending rib formation, spaced apart walls projecting radially inward, said rib formation and walls terminating in a boss defining a bearing for the motor shaft, and said rib formation defining with said boss and the internal walls of said end bell a condulet box.

5. A housing for an electric motor, including a field ring, end bells closing the opposite ends of said ring and substantially equal thereto in diameter, the assembly comprising said ring and said end bells presenting on its exterior a regular substantially uninterrupted surface, an internal formation in one of said end bells defining a condulet box, and wide passing openings from said condulet box to the exterior of the housing and to the interior of the field ring.

6. A housing for an electric motor, including a field ring, end bells abutting the opposite ends of said field ring, internal tie bolt supports on said end bells, tie bolts extending in spaced parallel relation to said field ring interiorly thereof and anchored to corresponding supports in said end bells, a radical air inlet opening in at least one of said end bells, and a radial internal formation in said one end bell adjacent said opening defining a baffle, said formation further constituting one of the aforesaid tie bolt supports.

7. A housing for an electric motor, including a field ring, end bells abutting the opposite ends of said ring, the assembly comprising said ring and said bells presenting on its exterior a surface free of interruption by devices uniting the elements of said assembly, means internally of said assembly securing said end bells to said ring, an axial opening in one of said end bells for access to said securing means, and a removable closure plate for said opening.

8. A housing for an electric motor, including a field ring, end bells closing the opposite ends of said field ring, at least one of said end bells being formed with a radial rib formation extending toward the axis of said end bell and terminating in a boss providing a bearing for the motor shaft, walls on said rib formation defining therewith a condulet box open toward the outer end of said end bell, an opening in the said outer end of said end bell for access to said condulet box, and a removable closure plate for said opening.

9. A housing according to claim 8, characterized by a wire passing opening in said rib formation from said condulet box to the interior of the said field ring, and another wire passing opening in the side wall of said one end bell from said condulet box to the exterior of the housing.

10. A housing for an electric motor, including a field ring, end bells closing the opposite ends of said field ring, internal tie bolt supports on said end bells, tie bolts extending between corresponding supports and connecting the assembly comprising said field ring and end bells into a unitary structure, a radial rib formation in at least one of said end bells defining a condulet box open toward the outer end of said end bell, an opening in the outer end of said end bell for access to said condulet box and tie bolts, a removable closure plate for said opening, and means communicating said condulet box with the interior and exterior of the motor housing.

11. A housing for an electric motor including a field ring, end bells having cylindrical portions abutting the opposite ends of said field ring and turned over end portions defining the ends of said housing, boss formations on the inner surfaces of said end bells including a formation dependent from the cylindrical portion of one of said end bells and having a longitudinal opening therethrough, and tie bolts extending between corresponding boss formations on said end bells and connecting the assembly comprising said field ring and end bells into a unitary structure.

References Cited in the file of this patent

UNITED STATES PATENTS

| | | |
|---|---|---|
| 1,300,373 | Garcelon | Apr. 15, 1919 |
| 1,488,498 | Hoff | Apr. 1, 1924 |
| 1,816,859 | Linders | Aug. 4, 1931 |
| 2,456,571 | Turner | Dec. 14, 1948 |
| 2,508,207 | Woll | May 16, 1950 |
| 2,512,136 | Brown | June 20, 1950 |

FOREIGN PATENTS

| | | |
|---|---|---|
| 230,143 | Switzerland | Mar. 1, 1944 |